United States Patent

Hirling

(10) Patent No.: US 6,705,198 B2
(45) Date of Patent: *Mar. 16, 2004

(54) LINEAR DRIVE

(75) Inventor: Ullrich Hirling, Denkendorf (DE)

(73) Assignee: Festo AG & Co., Esslingen (DE)

(*) Notice: Subject to any disclaimer, the term of this patent is extended or adjusted under 35 U.S.C. 154(b) by 64 days.

This patent is subject to a terminal disclaimer.

(21) Appl. No.: 10/088,465

(22) PCT Filed: Jul. 6, 2001

(86) PCT No.: PCT/EP01/07745

§ 371 (c)(1),
(2), (4) Date: Mar. 19, 2002

(87) PCT Pub. No.: WO02/16782

PCT Pub. Date: Feb. 28, 2002

(65) Prior Publication Data

US 2002/0134230 A1 Sep. 26, 2002

(30) Foreign Application Priority Data

Aug. 19, 2000 (DE) ..................... 200 14 353 U

(51) Int. Cl.⁷ .............................................. F01B 21/26
(52) U.S. Cl. ................. 91/1; 91/5 R; 92/169.1
(58) Field of Search ................. 91/1, 5 R; 92/169.1

(56) References Cited

U.S. PATENT DOCUMENTS

| | | | |
|---|---|---|---|
| 3,555,221 A | * 1/1971 | Booth | ............ 200/84 C |
| 4,207,565 A | * 6/1980 | Isakson et al. | ............ 92/5 R |
| 4,726,282 A | 2/1988 | LaBair | |
| 4,755,636 A | 7/1988 | Akio | |
| 4,982,652 A | * 1/1991 | Blatt | ............ 92/5 R |
| 5,378,882 A | 1/1995 | Gong et al. | |
| 5,662,022 A | 9/1997 | Stoll | |
| 5,732,613 A | * 3/1998 | Stoll et al. | ............ 92/5 R |
| 6,533,596 B2 | * 3/2003 | Demuth et al. | ............ 439/320 |

FOREIGN PATENT DOCUMENTS

| | | |
|---|---|---|
| DE | 29 18 294 A1 | 11/1979 |
| DE | 43 06 539 C2 | 9/1994 |
| DE | 44 10 363 A1 | 9/1995 |
| DE | 296 05 723 U1 | 5/1996 |
| DE | 201 06 298 U1 | 6/2001 |

OTHER PUBLICATIONS

Patent Abstracts of Japan, Pub. No. 09303326A, Nov. 25, 1997.

* cited by examiner

Primary Examiner—Edward K. Look
Assistant Examiner—Igor Kershteyn
(74) Attorney, Agent, or Firm—Hoffmann & Baron, LLP

(57) ABSTRACT

A linear drive comprising a housing having a tube body (3) and a terminally mounted housing cover (4). In the wall of the tube body (3) a cavity is located, into which a sensor (14) extends. The rear end section (21) of the sensor (14) is in a socket (18), arranged as an extension of the cavity, of the housing cover (4). This socket (18) is formed by a recess (22) and its opening (26) extends from the end face (23) facing the tube body (3), of the housing cover (4) as far as the adjacent lateral outer face (24) of the housing cover (4). The electrical lead means for the sensor (14) are associated with the lateral section of the recess's opening (26).

19 Claims, 5 Drawing Sheets

LINEAR DRIVE

FIELD OF THE INVENTION

The invention relates to a linear drive comprising a housing having a tube body containing a receiving space for a linearly moving drive part and a housing cover mounted on an end side of the tube body, a peripherally closed cavity formed in the wall of the tube body, which cavity is open toward the tube body's end face facing the housing cover, and at least one socket, which is provided as an axial extension of the cavity on the housing cover and also provided for the rear end section of a sensor serving for detection of at least one position of the drive part, said sensor extending from the socket into the cavity in the tube body.

BACKGROUND OF THE INVENTION

A linear drive of this type is described in the German patent publication 4,306,539 C2. In this known case the tube body possesses a channel-like cavity, formed the wall thereof and aligned with a socket, in the form of a receiving hole, in the housing cover mounted at the end. The sensor is designed in the form of rod and is plugged from the rear side of the housing cover through the receiving hole into the cavity in the tube body, the rear end section of the sensor being fixed in the receiving hole. At the rear end section of the sensor electrical leads are provided and associated with the rear side (opposite to the tube body) of the housing cover whence same make possible electrical contact and connection with the sensor.

In the case of linear drive the measure necessary for the holding in place of the sensor on the housing cover take up a relatively large space in the longitudinal direction of the linear drive. Same accordingly has a relatively large overall length. Therefore it is one object of the present invention to create a linear drive, which while providing for secure holding of the sensor in place has a small overall length.

SUMMARY OF THE INVENTION

In order to achieve this object there is a provision such that the socket is constituted by a recess in the housing cover, the opening of such recess extending from the end face, facing the tube body, of the housing cover continuously as far as the adjacent lateral outer face of the housing cover, the electrical lead means of the sensor being associated with the lateral section of the recess's opening.

It is in this manner that the rear end section of the sensor is seated in a recess, extending along a corner of the housing cover, the electrical contact with the sensor being possible from the side of the housing cover. The length, as measured in the longitudinal direction of the linear drive of the recess may be made relative short, something which means short dimensions of the housing cover and provides space within the housing cover for other means, which are necessary for the operation of the linear drive. Since the electrical lead means of the sensor are associated with the lateral section of the recess's opening, satisfactory accessibility is provided for. Finally it is also possible to ensure unloseable fixation of the sensor in place, since deinstillation is only possible by removal of the housing cover, this preventing unauthorized access.

Further advantageous developments of the invention are defined in the dependent claims.

It is preferred for the rear end section of the sensor to be in the form of an attachment section, by way of which the sensor is so held in the recess, that, as considered in the state with the tube body removed, it extends firmly held in a transverse position, that is to say it is secured in the transverse direction and practically incapable of movement, extending away from the housing cover. Therefore when mounting the sensor in place it is possible to firstly secure same with the attachment section in the recess in the housing cover in order in the course of later fixing of the housing cover on the tube body to simultaneously insert outwardly extending longitudinal section of the sensor into the cavity.

It is particularly advantageous for the rear end section of the sensor to be designed in the form of an attachment section, which renders possible plugged mounting of the sensor in the recess. In this case a design of the plug connecting means is preferred such that the direction of plugging coincides with the longitudinal direction of the linear drive.

The plug connecting means may for example be constituted by wells, which extend in the direction of plugging on the housing cover, such recesses being provided in the lateral faces of the recess and by lateral projections, fitting in the wells, of the sensor. Furthermore a reversed association of the plug connecting means would be possible here.

A design is preferred such that the sensor has its one attachment section held immovably in the axial direction between the housing cover and the tube body. It is in this manner that an exact, axially secured positioning of the sensor in relation to the housing of the linear drive is ensured without additional attachment means. This is for instance made possible by having the attachment section and the recess so matched in their dimensions that the sensor is proud of the tube body to a small extent when housing cover is not mounted on the tube body so that in the mounted state of the housing cover the tube body is acted upon by the facing end side of the tube body.

It is convenient for the recess to be closed, apart from the opening thereof extending from the end face as far as the lateral external face.

Preferably no fixation of the sensor's longitudinal section, extending into the cavity in the tube body, is required so that consequently the sensor is conveniently free right from the housing cover along its full length where it projects into the cavity of the tube body and apart from its rear end section is not fixed anywhere. At this point it is to be noted as well that the axial overall length of the sensor's longitudinal section extending into the cavity is preferably selected to be less than the overall length of the tube body, it being sufficient for the sensor to extend so far into the cavity that the part is covered or the point is reached, which is to be detected.

Preferably the cavity extends along the full overall length of the tube body and opens at the opposite end faces of the tube body. If housing covers are provided on both ends of the tube body and such housing covers have a recess with an associated sensor, it is accordingly possible for both sensors to extend from opposite sides into one and the same cavity.

Since the sensor may readily be so designed that the section of its length extending into the cavity does not require any transverse supporting action, the cross sectional shape of the cavity does not have to meet any special requirements and practically any design is possible. This means that the cross sectional shape of the cavity may be adapted to comply with other features of the tube body. It is for instance possible to have a tube body in the form of a extrude, which in its wall has a plurality of axially continuous channels distributed about the periphery of the receiving space, such channels being provide to save weight and material, one of such channels being utilized as a cavity to receive the sensor.

It is preferred for the electrical lead means of the sensor to be designed in the form of plug means so that a cable may be replaced as desired. Furthermore the sensor preferably has an essentially L-like shape, the longer limb extending into the cavity of the tube body while the shorter limb is provided on the rear end section and extends through the laterally aligned section of the recess's opening to the outside. In this case the electrical lead means are preferably provided on the shorter L limb of the sensor.

The sensor may be provided with light producing display means on the rear end section, such display means making it possible to indicate the operational state of the sensor. In this connection in the case of a particularly economic structure there may be such a provision that the sensor has a housing which is transparent at least at the rear end section, through which housing the light signals from the light display means are visible from the outside. Accordingly the light producing display means may be readily seen while the display area protected in an optimum manner.

The design in accordance with the invention is more particularly advantageous in the case of linear drives operated using fluid power. However, the invention is also applicable to linear drivess, which are operated with other types of energy, as for example electric power.

In the following the invention will be described with reference to the accompanying drawings.

DETAILED DESCRIPTION OF THE PREFERRED EMBODIMENTS

Figure 1:
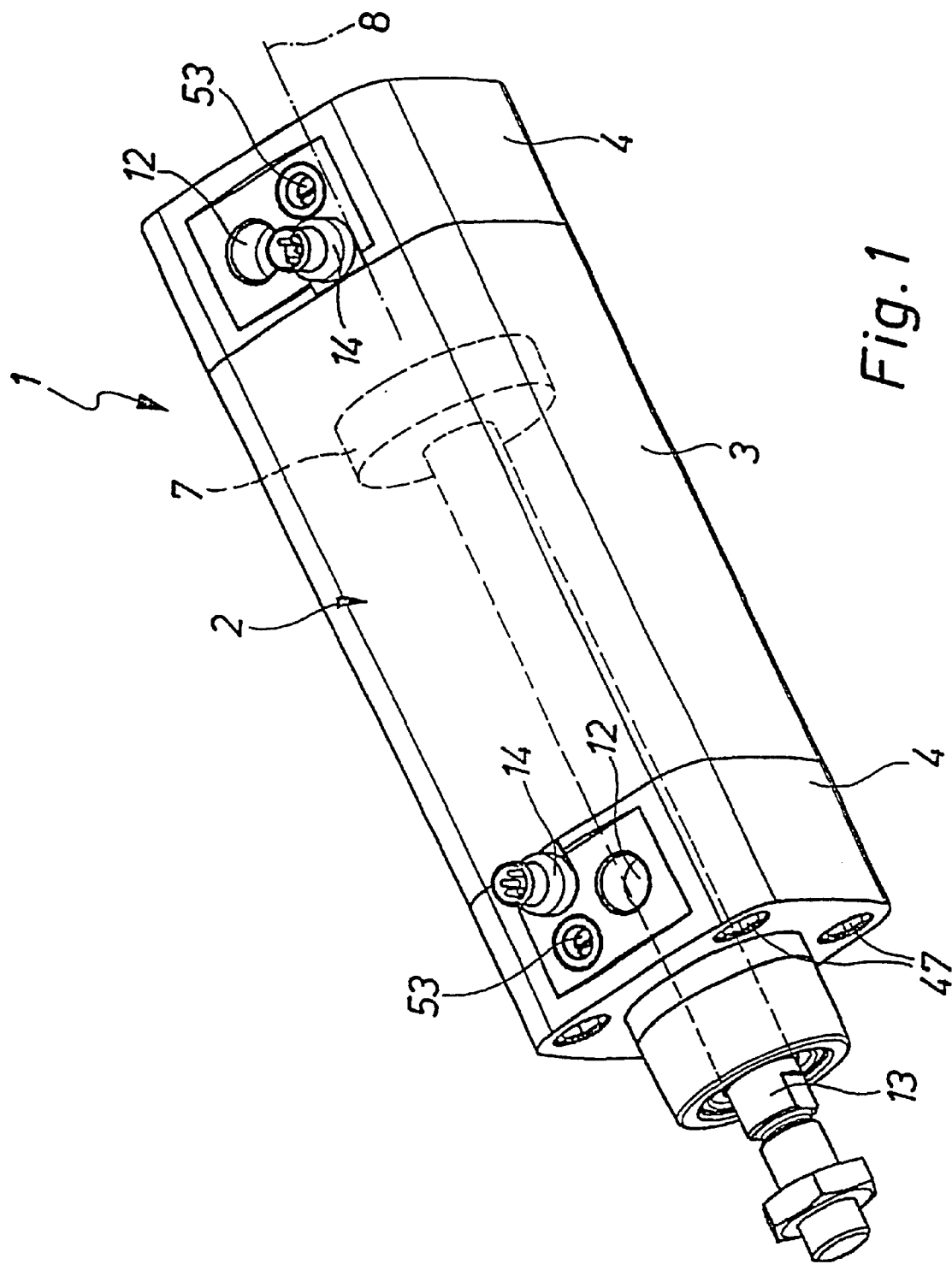
FIG. 1 shows a first design of the linear drive in accordance with the invention in perspective.
Figure 2:
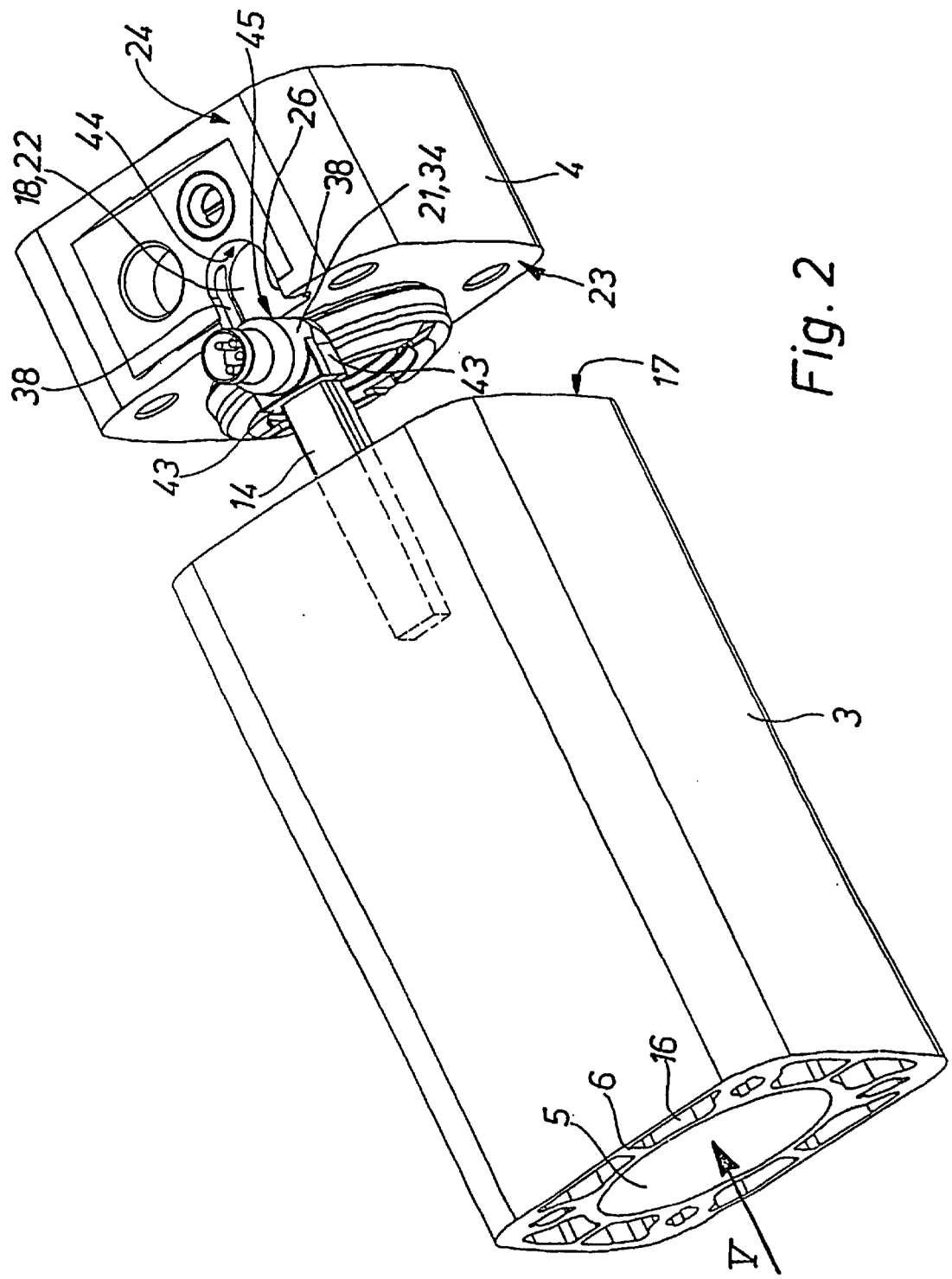
FIG. 2 shows a section of the linear drive of FIG. 1, which is limited to the representation of the part of the tube body and of the tube body and a rear housing cover, the components being illustrated in an exploded view.

The drawings show a fluid power operated linear drive 1, which possesses an elongated housing 2, a tube body and housing covers 4 mounted of the two ends of the tube body 3 permanently.

In the interior of the housing 2 a preferably cylindrical receiving space 5 is provided, which extends in the longitudinal direction of the housing 2 and which is delimited at the external periphery by the wall 6 of the tube body and at the end by the two housing covers 4.

A drive part 7 is provided in the receiving space 5 and this drive part 7 is in the form of a piston in the case of a fluid power version of the linear drive and is able to move inthe receiving space 5 in the direction of the longitudinal axis 8 of the housing. The drive part 7 divides the receiving space 5 axially into two working chambers into which a respective fluid duct 12 (running in the adjacent housing cover 4) opens and by way of such fluid duct the associated power duct may be supplied with fluid power medium, as for example compressed air, or may be depressurized or, respectively, vented. This means that the drive part 7 may be caused to perform a linear movement in the direction defined by the longitudinal axis 8 of the housing, and such motion may be transmitted to a transmitting part 13 or dog outside the housing engaged with the drive part 7.

Said transmitting part 13 is, in the present working example, in the form of a piston rod extending through the front housing cover 4, it making sliding engagement with such front housing cover so that accordingly the corresponding housing cover 4 may be termed a bearing cover. The opposite, rear housing cover 4 is in the form of a plain terminal cover.

In the case of an alternative design (not illustrated), the linear drive is in the form of a rod-less linear drive so that both housing covers 4 act as terminal housing covers and the transmission of power between the drive part 7 and the transmitting part 13 takes place in some other manner, for example by magnetic force or by means of a dog extending through a longitudinal slot in the housing 2.

In the case of a further design, not illustrated, of the linear drive as an electrical drive the drive part 7 is operated by electrical energy, for instance using a lead screw drive.

The linear drive 1 is provided with a position detecting means, which renders it possible to detect a plurality of positions assumed by the drive part 7 in relation to the housing 2. In the case of such positions to be detected it is for example a question of terminal positions of the drive part 7 as defined by the maximum stroke of the drive part 7. This system includes a respective sensor 14 for the two axial end parts of the housing 2, such sensor being able to respond, without making physical contact, to an actuating element constituted by the drive part 7 or provided therein, when such actuating element, in the course of its linear motion, assumes a position near suitable detection means 15 for the sensor 14 and more especially assumes such a position that it is radially opposite the detection means 15 on the inside thereof.

The actuating element may for instance be in the form of a permanent magnet and the sensor 14 may be a so-called reed switch, in the case of which the detection means 15 are operated by the magnetic field of the actuating element.

The arrangement and design of the two sensors 14 is identical in the present working example so that the following detailed account is only in relation to the sensor 14 which is associated with the rear housing cover 4. The description therefore applies also for the sensor provided on the front housing cover 4, it being necessary to mention that the linear drive 1 may be designed so that a sensor is provided only on one housing cover and each housing cover may be provided with several sensors.

The respective sensor 14 is provided with a cavity 16 in the wall 6, which peripherally delimits the receiving space 5, of the tube body 3, such cavity 16 preferably extending in the longitudinal direction of the tube body and being entirely enclosed in the peripheral direction. Such cavity 16 opens at the end face, herein termed the first end face 17, of the tube body, on which the housing cover 4 is mounted. With a view to simplifying manufacture the cavity 16 extends along the full overall length of the tube body 3 and opens at its opposite end faces. This means that it is possible to have a tube body 3 in the form of an extrude in whose wall 6 one or more axially continuous channels 19 extend which are distributed about the periphery of the receiving space 5 and of which one is utilized as a cavity 16.

As an axial extension of the cavity 6 a socket 18 is provided for the rear end section 21 of the sensor 14. This socket 18 is constituted by a recess 22 in the housing cover 4, which is placed like a cutting in the transitional area between the end face (in the following termed the second end face 23) of the housing cover 4 and the lateral outer face 24 in the housing cover 4, such face 24 facing radially outward in relation to the housing's longitudinal axis 8. Since the second end face 23 merges with the lateral outer face 24 at a surrounding edge 25, which dependent of the design may be sharp or blunt, it is possible to say that the recess 22 severs the edge 25 and in effect constitutes a recess extending along a corner. The recess's opening 26, which defines the transition to the second end face 23 and the lateral outer face 24 thus the tube extends from the second end face 23, which is turned toward the body 3, continuously as far as the adjacent lateral outer face 24, it having a first opening section 27 opening at the second end face 23 and a second opening section 28 opening at the lateral outer face 24. These opening sections 27 and 28 merge with each other continuously, i. e. without interruption.

The sensor 14 is an elongated component and in the working example possesses an essentially L-like shape. The transitional zone between the longer limb 32 and the short limb 33 here defines the rear end section 21 of the sensor 14. In the working embodiment illustrated the same is in the form of an attachment section 34, by way of which the sensor 14 is fixed in the recess, it having its longer limb 32 projecting out of the first opening section 27 having its shorter limb 33 extending out of the second opening section 28 of the recess 24. The longer limb 32 here extends in parallelism to the housing's longitudinal axis 8 and extends into the associated cavity 16, whose opening, provided at the first end face 17, is aligned with the first opening section 27, provided at the second end face 23 of the housing cover 4, of the recess 22.

The above mentioned detection means 15 are located in the longer limb 32, with which same are preferably integrated. They are internally connected with electrical lead means 35 for the sensor, which serve for making an electrical contact and are arranged in the lateral, second section 28 of the recess's opening 26. In the working embodiment the electrical lead means 35 are provided on the shorter limb 33 and are preferably in the form of plug means, which render possible a detachable connection with electrical leads for the connection of other equipment, for instance in the form of a cable. It would be feasible to have electrical leads in the form of fixed conductors or electrical lead means in the form of wireless signal transmitting means or as for instance infrared transmission means or using radio waves.

In the mounted state the sensor 14 is consequently seated so that its rear end section 21 fits into the recess 22, whence it extend into the associated cavity 16 in the tube body 3 and whence the electrical contact making means extends outward to the side. Removal of the sensor 14 is only possible after firstly removing the housing cover 4, something which prevents tampering. Furthermore, the locking of the attachment section 34 in the recess 32 ensures a permanent exact setting of the axial position of the sensor 14 and accordingly the detection means 15 provided on same. Without complex adjustment it is thus possible to set the position of the sensor 14 as part of assembly work by the manufacturer of the linear drive. Here there is the possibility of making available several sensors 14 which are different as regards their axial overall length and, respectively, the axial position of the detection means 15 so that customization may include the mounting of a sensor, which exactly corresponds to the relevant position of the drive part 7. In this respect it would also be possible to so design the detection means 15 that same are suitable for detecting a plurality of positions.

Preferably the attachment section 34 of the sensor 14 is so adapted to the configuration of the recess 22 that when same is mounted in the recess 22 it is held in the recess 22 even when housing cover 4 is not yet installed on the tube body 3. This opens up the possibility of prefixing the sensor 14 on the housing cover 4 and during following fitting of the housing cover 4 automatically positioning the sensor 14 in place.

Figure 3:
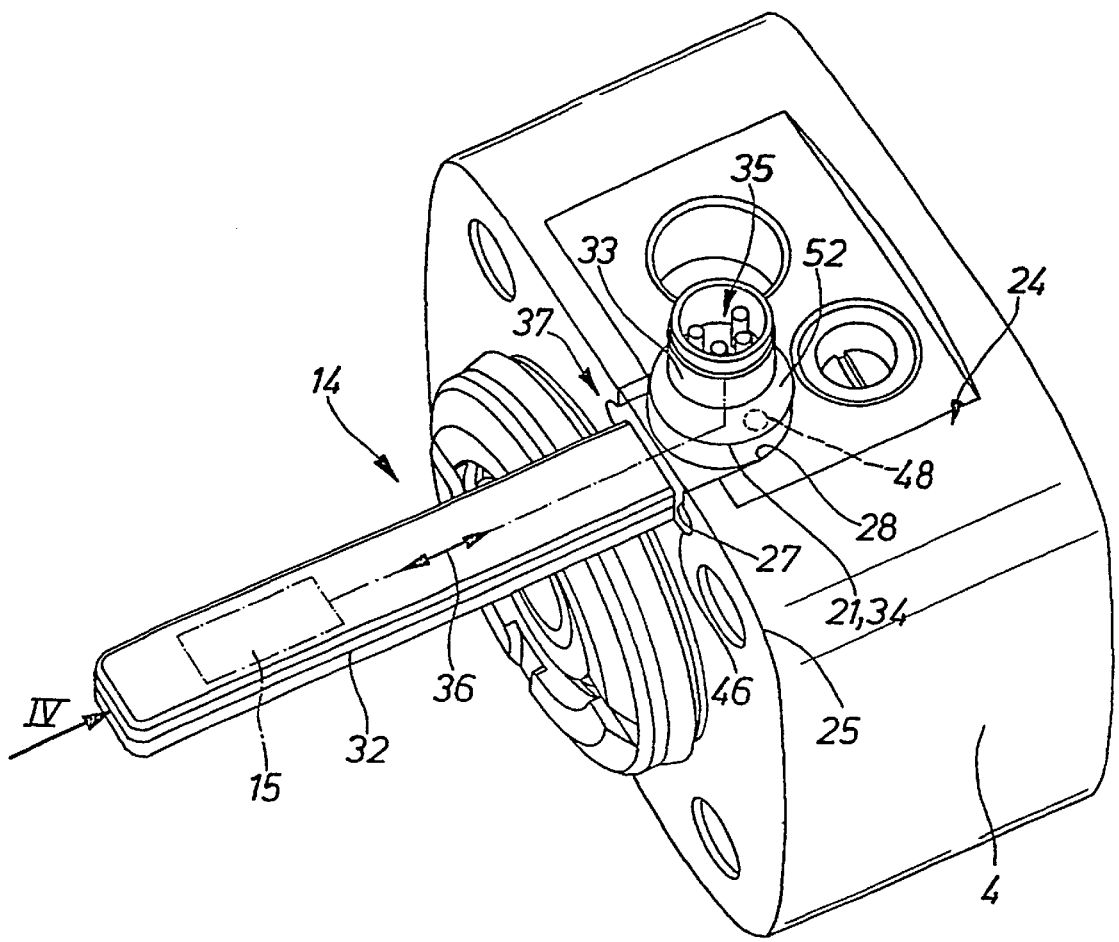
FIG. 3 shows housing cover of the linear drive in accordance with FIGS. 1 and 2 in a separate view with the sensor secured thereto.
Figure 4:
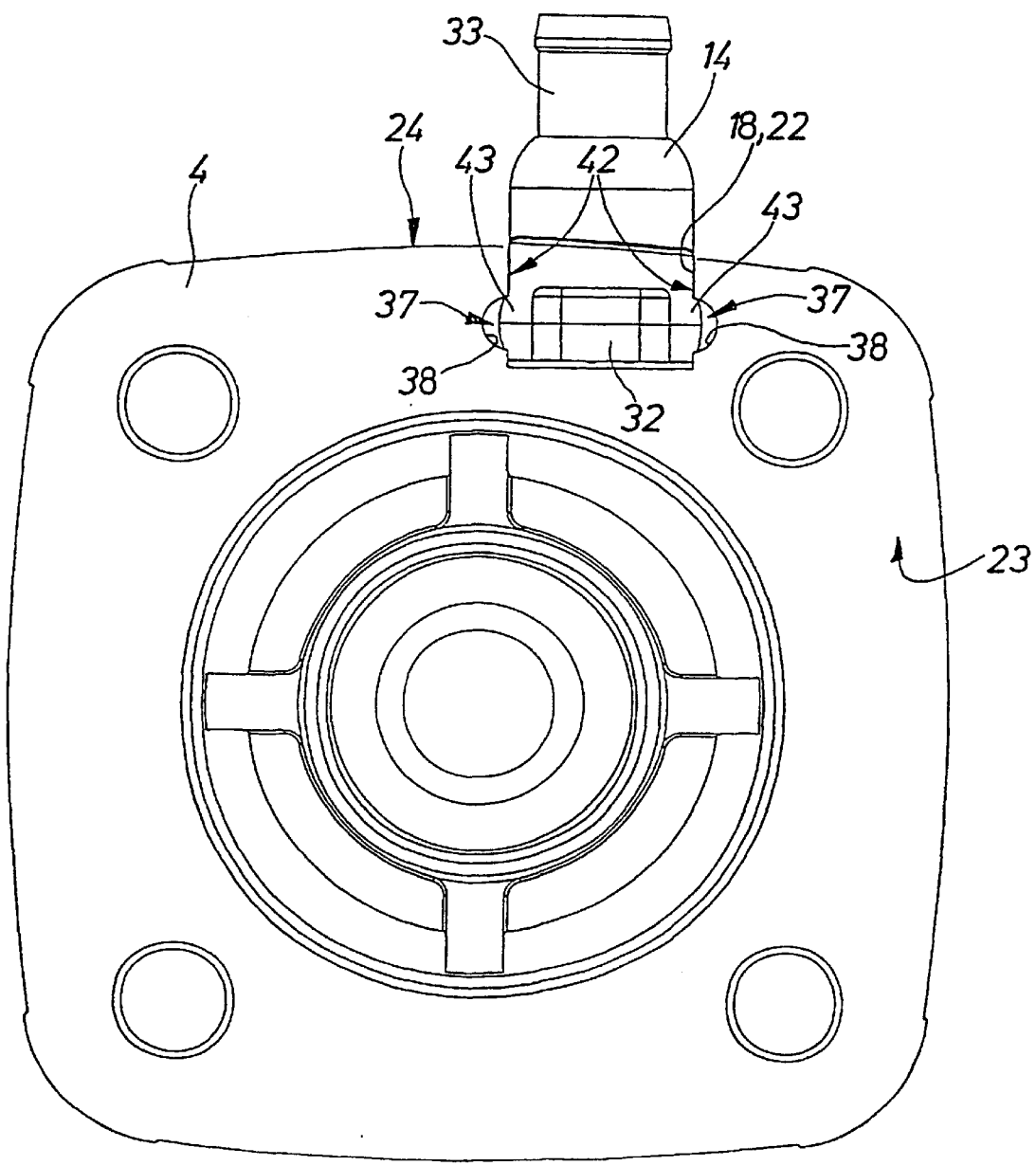
FIG. 4 shows an end-on view of the arrangement of FIG. 3 looking in the direction of the arrow IV.
Figure 5:
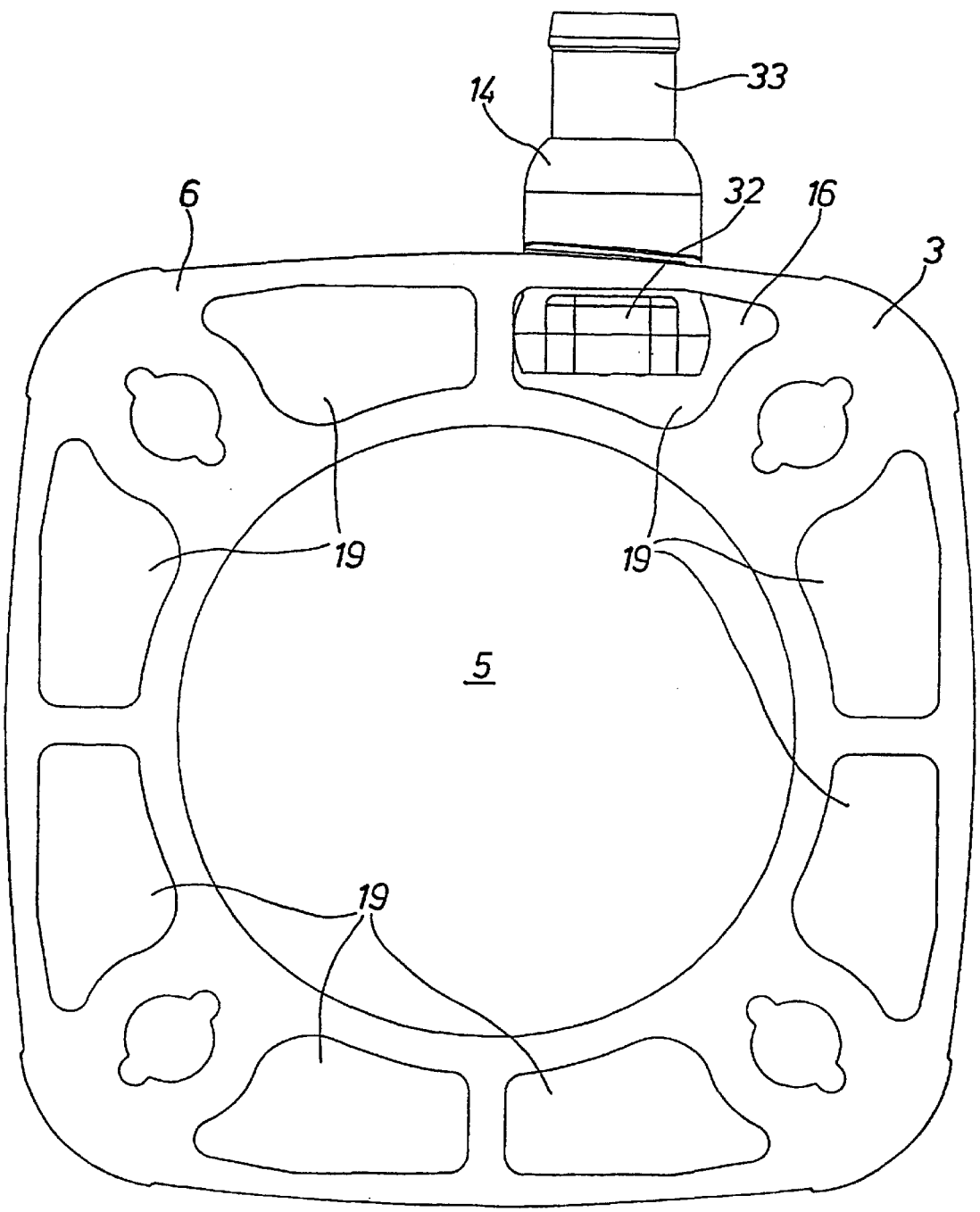
FIG. 5 is an end-on view of the arrangement of FIG. 2 looking in the direction of the arrow V.

FIG. 3 shows the housing cover 4 removed from the tube body 3 and with the sensor 14 fitted in the recess 22, the sensor 14 being so held in the recess 22 that it is firmly held in the transverse position, that is to say practically immovably held in the transverse position, and it extends away from the housing cover 4.

The consequence of this is that with the housing cover 4 mounted on the tube body 3, the sensor 14 has its entire length in the tube body so that it is practically free on all the sides in the cavity 16 and apart from the attachment section 34 is not fixed to the housing anywhere. This means that adaptation of the cross sectional shape of the cavity 16 to that of the length section, projecting in the cavity 16, of the sensor 14 is unnecessary. The sole condition as regards the shape of the cavity 16 is that same should render possible insertion of the sensor 14. It is in this manner that it is generally possible to use readily available extruded tubular material for the tube body 3, the cross sectional shape of the longer limb of the sensor 14 being so designed that insertion into the channels 19 in the wall 6 of the tube body 3 may be undertaken without any trouble.

It is convenient for the attachment section 34 of the sensor 14 to be so designed that it is able to be fixed in position by plugging in the recess 22. The arrangement is then preferably such that the direction 36 of plugging indicated by the double arrow in FIG. 3 is at a right angle to the second end face 23 of the housing cover 4.

The plug means 37 rendering possible the plug connection are preferably so designed that they only allow one degree of freedom for the sensor 14 in the direction 36 of plugging, whereas all other degrees of freedom are locked. This means that more particularly it is impossible for the plugged in attachment section 34 to be removed past the second section 28 of the recess 22 or to be turned about its longitudinal axis. Such a secure fixation in place furthermore ensures an exact position with correspondingly exact detection.

In the working embodiment the plug connection means 37 are constituted by groove-like wells 38 running in the plugging direction 36 on sides of the recess 22, such wells being located on the two mutually opposite side faces 42 of the recess 22. These side faces 42 lie in planes, which run at a right angle to the second end face 23 and at the same time extend athwart the lateral outer face 24. The wells 38 open at the second end face 23 and extend approximately along the length, as measured in the plugging direction 36, of the recess 22.

The plugging means 37 provided on the attached section 34 are formed by laterally projecting and for example rib-like projections 43, which also run in the plugging direction 36 and which on insertion of the sensor 14 fit into the wells 38. It will be clear that the arrangement may also be reversed so that the projections are located on the lateral wall of the recess 22 and the wells 38 are in the lateral face of the attachment section 34.

The depth of insertion, as measured in the plugging direction 36, of the attachment section 34 may be preset by having a matching length of the plugging connection means 37. Preferably, however the limitation of the depth of insertion is by the rear delimiting face 44, of the recess 22 opposite the first opening section 27 in the plugging direction 36, against which face 44 the inserted sensor rests on the rear face 45 of the attachment section 34. Here it is an advantage for the rear delimiting face 44 of the recess 22 to have a concave shape as illustrated and for the rear side 45 of the attachment section 34 to be convex and complementary thereto.

The sensor 14 can be secured in the desired position without using specially adapted attachment means, that is to say simply by the cooperation with the housing cover 4 and the tube body 3. For this purpose the shape and the overall length of the attachment section 34 and of the recess 22 may be so matched that in the position inserted into the recess 22 but before mounting the housing cover 4 on the tube body the attachment section 34 slightly projects past the zones of the second end face 23 adjacent to the recess 22. The correspondingly projecting part of the attachment section 34 is depicted in FIG. 3 at 46. If now the housing cover 4 is mounted on the tube body 3 and is clamped to same, for example using attachment screws 47 or other attachment means, axially, the projecting part 46 will be acted upon by the first end face 17 of the tube body 3. As a result the sensor 14 will have its attachment section 34 clamped in an axially immovable fashion between the housing cover 4 and the tube body 3.

In the case of this type of attachment manufacture of the attachment section 34 of a material is preferred which possesses a certain degree of deformability, for instance a plastic material. Furthermore, the amount by which the part 46 stands proud is selected to be relatively small. This means that the desired clamping effect is produced and simultaneously a flush surface-to-surface contact of the two end faces 17 and 23 is ensured.

The recess 22 is preferably closed on all sides apart from the recess's opening 26 so that more particularly entry of foreign matter is prevented.

In order to indicate particular operational states of the sensor 14 the sensor 14 is provided with light producing display means 48 at its rear end section 21, such means being for example one or more LEDs. Such LEDs are located in the interior of the sensor 14 and may be arranged on a printed circuit board, not illustrated in detail, which carries the detection means 15 and/or the other electronic components required for the operation of the sensor 14. In order nevertheless to ensure good visibility of the LED signals, the housing 52 of the sensor 14 is manufactured of a transparent material at least adjacent to the attachment section 34 and preferably entirely. It is in this manner that it is possible for all functional parts of the sensor to be encapsulated in a fluid-tight fashion without reducing the indicating effect thereof.

In the working embodiment the sensors 14 provided on the two housing covers 4 extend into different cavities 16 in the housing 2. It will however be clear that a common cavity could be provided for all sensors 14, if this should be allowed by the overall length of the sensor section extending into the cavity.

Even in the case of a relatively short length of the recess 22, as measured in the direction of the housing's longitudinal axis 8, an extremely reliable fixation of the sensor 14 may be ensured. The consequence of this is that the housing cover 4 has an extremely short overall length, this leading to compact dimensions of the linear drive 1. Moreover, the attachment means for the sensor 14 only occupy an extremely small fraction of the overall volume of the housing cover 4 so that there is sufficient free space for the installation or integration of further functional components in the housing cover 4. FIG. 1 shows for example a set screw 53 arranged in an axial continuation of the recess 22 in the housing 4, for a speed regulating valve or for a pneumatic damping means to slow down when approaching the terminal position.

What is claimed is:

1. A linear drive comprising a housing having a tube body containing a receiving space for a linearly moving drive part and a housing cover mounted on an end side of the tube body, a peripherally closed cavity formed in a wall of the tube body, which cavity is open toward the tube body's end face facing the housing cover, and at least one socket, which is provided as an axial extension of the cavity into the housing cover and also provided for a rear end section of a sensor serving for detection of at least one position of the drive part, said sensor extending from the socket into the cavity in the tube body, wherein the socket is constituted by a recess in the housing cover, an opening of such recess extending from the end face, facing the tube body, of the housing cover continuously as far as an adjacent lateral outer face of the housing cover an electrical lead means of the sensor being associated with a lateral section of the recess's opening.

2. The linear drive as set forth in claim 1, wherein a rear delimiting face, which is opposite to a section of the recess's opening turned toward the tube body, is concave in shape, the rear end section of the sensor having a convex shape which is complementary of an associated rear side.

3. The linear drive as set forth in claim 1, wherein apart from the recess's opening, the recess is closed.

4. The linear drive as set forth in claim 1, wherein starting at the housing cover, the sensor has its full length, which extends into the cavity, free on all sides and apart from its rear end section is not fixed at any point.

5. The linear drive as set forth in claim 1, wherein the tube body is in the form of an extrude and in its wall has a plurality of axially continuous channels, distributed about the periphery of the receiving space, one such channel forming the cavity.

6. The linear drive as set forth in claim 1, wherein the electrical lead means of the sensor are in the form of plug means.

7. The linear drive as set forth in claim 1, wherein the sensor has light producing display means, same being placed at the rear end section.

8. The linear drive as set forth in claim 7, wherein the sensor possesses a housing which is transparent at least at the rear end section, through which the light signal of the light producing display means, enclosed by the housing, may be seen from the outside.

9. A linear drive comprising a housing having a tube body containing a receiving space for a linearly moving drive part and a housing cover mounted on an end side of the tube body, a peripherally closed cavity formed in a wall of the tube body, which cavity is open toward the tube body's end face facing the housing cover, and at least one socket, which is provided as an axial extension of the cavity into the housing cover and also provided for a rear end section of a sensor serving for detection of at least one position of the drive part, said sensor extending from the socket into the cavity in the tube body, wherein the socket is constituted by a recess in the housing cover, an opening of such recess extending from the end face, facing the tube body, of the housing cover continuously as far as an adjacent lateral outer face of the housing cover an electrical lead means of the sensor being associated with a lateral section of the recess's opening and wherein the rear end section of the sensor is designed in the form of an attachment section by way of which the sensor is so held in the recess that as viewed after removal of the tube body, same extends in a firmly held transverse position from the housing cover.

10. The linear drive as set forth in claim 9, wherein the plug connecting means on the housing cover are constituted by wells extending in a direction of plugging in lateral faces of the recess and on the sensor are constituted by lateral projections fitting into the well or vice versa.

11. A linear drive comprising a housing having a tube body containing a receiving space for a linearly moving drive part and a housing cover mounted on an end side of the tube body, a peripherally closed cavity formed in a wall of the tube body, which cavity is open toward the tube body's end face facing the housing cover, and at least one socket, which is provided as an axial extension of the cavity into the housing cover and also provided for a rear end section of a sensor serving for detection of at least one position of the drive part, said sensor extending from the socket into the cavity in the tube body, wherein the socket is constituted by a recess in the housing cover, an opening of such recess extending from the end face, facing the tube body, of the housing cover continuously as far as an adjacent lateral outer face of the housing cover an electrical lead means of the sensor being associated with a lateral section of the recess's opening and wherein the rear section of the sensor is designed in the form of an attachment means by way of which the sensor may be held in position in the course of assembly by plugging.

12. The linear drive as set forth in claim 11, wherein the attachment section and the recess are so provided with cooperating plug connecting means that the sensor may be plugged in past the section, facing the tube body, of the recess's opening into the recess and in the plugged-in state, is held immovably in the position athwart a direction of plugging.

13. The linear drive as set forth in claim 11, wherein the sensor is clamped at its attachment section in an axially immovable fashion between the housing cover and the tube body.

14. The linear drive as set forth in claim 13, wherein, when the housing cover is not mounted on the tube, the attachment section of the sensor extends a small distance past the end face facing the tube body of the housing cover and in the mounted state of the housing cover is acted upon by the facing end face of the tube body.

15. A linear drive comprising a housing having a tube body containing a receiving space for a linearly moving drive part and a housing cover mounted on an end side of the tube body, a peripherally closed cavity formed in a wall of the tube body, which cavity is open toward the tube body's end face facing the housing cover, and at least one socket, which is provided as an axial extension of the cavity into the housing cover and also provided for a rear end section of a sensor serving for detection of at least one position of the drive part, said sensor extending from the socket into the cavity in the tube body, wherein the socket is constituted by a recess in the housing cover, an opening of such recess extending from the end face, facing the tube body, of the housing cover continuously as far as an adjacent lateral outer face of the housing cover an electrical lead means of the sensor being associated with a lateral section of the recess's opening and wherein the cavity extends along the entire overall length of the tube body and opens at opposite end faces of the tube body.

16. A linear drive comprising a housing having a tube body containing a receiving space for a linearly moving drive part and a housing cover mounted on an end side of the tube body, a peripherally closed cavity formed in a wall of the tube body, which cavity is open toward the tube body's end face facing the housing cover, and at least one socket, which is provided as an axial extension of the cavity into the housing cover and also provided for a rear end section of a sensor serving for detection of at least one position of the drive part, said sensor extending from the socket into the cavity in the tube body, wherein the socket is constituted by a recess in the housing cover, an opening of such recess extending from the end face, facing the tube body, of the housing cover continuously as far as an adjacent lateral outer face of the housing cover an electrical lead means of the sensor being associated with a lateral section of the recess's opening and wherein the sensor has an essentially L-like configuration, a longer limb extending into the cavity and a shorter limb being provided on the rear end section and extending through the laterally aligned section of the recess's opening.

17. The linear drive as set forth in claim 16, wherein the electrical lead means are provided on the shorter limb of the sensor.

18. A linear drive comprising a housing having a tube body containing a receiving space for a linearly moving drive part and a housing cover mounted on an end side of the tube body, a peripherally closed cavity formed in a wall of the tube body, which cavity is open toward the tube body's end face facing the housing cover, and at least one socket, which is provided as an axial extension of the cavity into the housing cover and also provided for a rear end section of a sensor serving for detection of at least one position of the drive part, said sensor extending from the socket into the cavity in the tube body, wherein the socket is constituted by a recess in the housing cover, an opening of such recess extending from the end face, facing the tube body, of the housing cover continuously as far as an adjacent lateral outer face of the housing cover an electrical lead means of the sensor being associated with a lateral section of the recess's opening and wherein the drive part is in the form of an axially sliding piston.

19. A linear drive comprising a housing having a tube body containing a receiving space for a linearly moving drive part and a housing cover mounted on each opposite end side of the tube body, a peripherally closed cavity formed in a wall of the tube body, which cavity is open toward the tube body's end face facing the housing cover, and at least one socket, which is provided as an axial extension of the cavity into the housing cover and also provided for a rear end section of a sensor serving for detection of at least one position of the drive part, said sensor extending from the socket into the cavity in the tube body, wherein the socket is constituted by a recess in the housing cover, an opening of such recess extending from the end face, facing the tube body, of the housing cover continuously as far as an adjacent lateral outer face of the housing cover an electrical lead means of the sensor being associated with a lateral section of the recess's opening and wherein, at least one such housing cover has at least one recess for a the sensor.

* * * * *